United States Patent Office 3,249,512
Patented May 3, 1966

3,249,512
IN SITU DEXTROSE PRODUCTION IN
CRUDE AMYLACEOUS MATERIALS
Harold E. Bode, 14170 Onaway, Cleveland, Ohio
No Drawing. Filed May 28, 1963, Ser. No. 283,785
7 Claims. (Cl. 195—31)

This application is a continuation-in-part of my copending application Serial No. 38,716, filed June 27, 1960, now abandoned.

This invention relates to an improved method of producing dextrose in situ amylaceous edible food or feed products.

Most food products are used in conjunction with sugars such as dextrose, sucrose, invert sugars and the like.

The starch in amylaceous foods is capable of being hydrolyzed by either enzyme or acid catalysts into sugars such as dextrose or maltose. Since, in most cases, the cost of the starch in an amylaceous food is considerably less than the prevailing costs for a refined sugar such as sucrose or dextrose, food technologists have long searched for practical means of converting some or all of the starch in a food material to dextrose without deleteriously affecting the protein and fat materials which are always present in amylaceous foods such as cereal flours, many vegetables and some fruits.

In the past, attempts to convert some of the starch in a food to a sugar composition that could qualitatively compete with a sugar liquor obtained by dissolving crystalline, refined dextrose or sucrose in water, have always ended in failures because of the inability to produce a sugar product in situ in the cereal or vegetable without simultaneously producing sufficient hydrolysis of the protein and fat present in the amylaceous food product to cause extremely undesirable taste or flavor effects.

If amylaceous food products such as wheat flour, corn flour, peas, beans or bananas are subjected to acid startch hydrolyzing agents, the starch is converted to mixtures of dextrose, maltose, dextrins and some bitter tasting polysaccharides, such as gentiobiose. Simultaneously, the same acid catalyst acts on the protein material in the food product to produce bad tasting protein break-down products such as soluble polypeptides and free amino acids.

These protein hydrolytic break-down products are not only objectionable because of their own ill-tasting effects, but are also responsible for the subsequent production of sugar-addition products which also posses objectionable taste and flavor properties. These sugar-addition products result from the interaction of reducing sugars such as dextrose or maltose with amino acids or polypeptides to produce nitrogenous sugar derivatives that contribute toward severe color formation and further deleterious taste and flavor effects.

In addition to the bad effect of the protein present in the food, and acid catalyst also acts on the fat to cause some kind of fat hydrolysis whereby deleteriously tasting fatty material is liberated.

In view of the above difficulties, it is not possible to consider an acid catalyst as a practical means for the in situ production of sugar in an amylaceous food material.

The same principles and objections apply when ordinary diastatic enzymes are used for the purpose of hydrolyzing the starch in the food to sugar material. Ordinary diastases contain protease and lipase enzyme impurities which causes, during an amylase startch conversion, some hydrolysis of the protein and fat present in the amylaceous food product.

The protease present in ordinary commercial malt or fungal amylases can be objectionable from both a flavor or a food product physical structure standpoint. Thus, in the case of the processing of wheat flour into bread, the physical structure of the wheat gluten is important to the structure of the finished baked bread; and the hydrolysis of this wheat gluten by any protease would result in poor quality finished bread products, particularly from a physical structure standpoint.

In addition to the presence of proteases and lipases, most commercial diastases are inefficient producers of sweetening sugars. Ordinary malt disease converts or hydrolyzes the starch in the food product to a mixture of maltose and dextrins. Maltose has relatively little sweetening powers and the diastatically produced dextrins have considerably less sweetening effects than maltose. The only enzyme producible sugar which can be considered to be of practical value in an in situ process for obtaining sugar from an amylaceous food product is the sugar known as dextrose. This sugar is about three-fourths as sweet as sucrose. However, in addition to the sweetness factor, sugars are frequently used in food products for other purposes, particularly as a food or substrate for fermenting microorganisms which ferment sugars to such materials as ethanol, acetic acid or lactic acid.

From a sugar fermentability standpoint, dextrose is one of the most efficient sugars, and is superior to maltose or sucrose. Because of this, dextrose is the preferred sugar in food processing involving a step including the fermentation of a sugar composition. Examples of food industries wherein the use of dextrose is highly desirable from a fermentation standpoint, are the baking industries, particularly bread baking and the brewing industry.

Since as above explained, dextrose is an ideal sugar for use in food manufacture, the ideal objective in any kind of in situ process for creating sugar during the manufacture of a food product is to have a condition wherein a starch hydrolyzing catalyst produces from starch exclusively dextrose, without any kind of simultaneous hydrolysis of protein or fat material which may be present in the food product.

Special diastases capable of producing dextrose from certain polysaccharide materials are known to the art. However, these dextrose producing enzymes are unsatisfactory for this invention because of the presence of enzymes impurities such as proteases, lipases, and enzymes capable of causing the polymerization of liberated dextrose into sugar polymers which have a bitter taste and which cause a loss of dextrose yield.

In accordance with this invention, the preferred dextrose producing enzyme to be used in an in situ sugar-producing process is an enzyme substantially devoid of any protease, lipase, or transglucosidase activity. Such an enzyme is an amylase known as amyloglucosidase. This enzyme has the unique property of being capable of breaking down the starch polysaccharide units exclusively into free dextrose.

Amyloglucosidase is, therefore, an ideal enzyme for in situ dextrose production during the processing of an amylaceous food product. However, prior art enzyme products containing amyloglucosidase have been unable to fulfill the conditions required for a satisfactory in situ producing food product process because of the presence of objectionable other enxyme fractions, such as proteases, lipases and transglucosidases.

The absence of significant amounts of transglucosidase becomes of particular importance when an amylaceous material is subjected to a prolonged amyloglucosidase action, such as is the case when the creation of large amounts of in stiu dextrose are desired. Under such prolonged enzyme converting conditions, the dextrose liberated by amyloglucosidase would tend to be polymerized by the transglucosidase impurities into poor tasting sugar polymers. An ordinary crude fungal enzyme liquor, such as an amylase liquor prepared from *Aspergillus niger*, contains, in addition to amyloglucosidase, substantial amounts of transglucosidase, protease and some lipase. Such an enzyme product has been used for the treatment of acid-hydrolyzed refined starch liquors for the purpose of increasing the dextrose content in a product such as corn syrup. In such a process, the said crude enzyme mixture can operate satisfactorily because of the absence of protein and fat impurities in the acid-converted refined starch liquor. For the treatment of an amylaceous food product containing protein and fat, the use of such a fungal enzyme would be impractical.

One object of this invention is to produce an enzyme-converted amylaceous food product, wherein the sole end-product from an amylase conversion is dextrose.

Another object of this invention is to provide a process wherein an amylase-treated amylaceous food product has some of its starch converted in situ solely to dextrose and wherein none of the non-starch materials in the said food are modified by the said amylase.

Still another object of the invention is to modify amylaceous material intended for subsequent carbohydrate fermentation, by an enzymatic in situ formation of dextrose from the starch within said amylaceous material, without simultaneously enzymatically modifying the protein, fat, or the insitu liberated dextrose of said treated amylaceous material.

A further object of the invention is to provide a means for the enzymatic in situ production of dextrose from the starch in an amylaceous food without substantially affecting the taste or flavor contributed by the non-starch materials in the said food product.

A still further object of the invention is to enzymatically produce in situ dextrose in an amylaceous food under conditions wherein the said resulting dextrose will have the same taste or fermenting effects as that obtained by the separate addition of crystalline dextrose to the said food product.

Another object of the invention is to provide an improved process for producing bread or other bakery products, wherein dextrose is produced from the dough by the in situ action of amyloglucosidase added to the dough, said enzyme containing neither sufficient protease to weaken materially the dough structure, nor transglucosidase to produce bitter, non-fermentable dextrose polymers, nor enzyme impurities that adversely affect the odor and taste of the baked goods.

Other objects of the invention will, in part, be obvious and will, in part, appear hereinafter.

For the purposes of this invention, the preferred dextrose producing amylase is a refined fungal amyloglucosidase. It is known that amyloglucosidase is present in certain varieties of amylases. An amylase source which is known to contain substantial amounts of amyloglucosidase is fungal extract obtained from certain fungi, such as, for example, *Aspergillus niger* or *Aspergillus phoenicis*.

For the purposes of my invention, I prefer to use a refined amyloglucosidase obtained by isolation from a crude *Aspergillus niger* extract of high amyloglucosidase content. Such crude amyloglucosidase extracts are known to the prior art as materials which can serve as a practical reagent for the conversion of refined starch to dextrose solutions and the subsequent crystallization of pure dextrose from the said dextrose liquors.

This crude amyloglucosidase reagent is, however, unsuitable for the purposes of my invention because of the presence of proteases, lipases, transglucosidase and musty odor ingredients originating from the fungi. In order to be able to practice my invention, it is necesary to subject this crude amyloglucosidase fungal extract liquor to a refining treatment which isolates the amyloglucosidase and removes substantially all protease, lipase, and transglucosidase impurities.

The refining of crude amyloglucosidase can be carried out by methods known to the prior art. Thus, selective inorganic adsorbents such as silicates or bentonite, selective inorganic salt solutions such as sodium chloride or ammonium sulfate, and selective liquid organic solvents may be used in various combinations to attain the necessary degree of amyloglucosidase purity.

In the case of organic solvents, any selective organic liquid solvent which dissolves amyloglucosidase, but does not dissolve transglucosidase, protease, lipase or other amylases; and simultaneously is incapable of irreversibly inactivating amyloglucosidase, would be suitable selective solvents.

Examples of selective organic solvents are acetone and isopropanol. Their use for amyloglucosidase refining is discussed by Underkofler and Vicente, Iowa State College Journal of Science, volume 30, page 445 (1956). The use of bentonite for amyloglucosidase refining is also discussed by these authors. Dirks and Miller describe the separation of proteases from amylases by adsorbing the proteases on aluminum silicate, Cereal Chemistry, March 1949, pages 98–109. U.S. Patent No. 2,121,459 describes the removal of proteases from amylase in enzyme mixtures obtained from malted grains, molds, or bacteria. This is accomplished by the selective adsorption of protease with various aluminum oxides, such as bauxite.

In general, any reagent or reagent combination which does not deleteriously affect the enzymatic activity or the water solubility of amyloglucosidase, but which acts as a selective material to separate non-amyloglucosidase enzymes from non-refined amyloglucosidase, may be used to produce a refined amyloglucosidase which is capable of functioning in accordance with the principles set forth by this invention. The particular combination of refining reagents and refining steps which would be used to obtain an amyloglucosidase of satisfactory purity will depend upon the individual economy of the production of the crude amyloglucosidase liquor.

A description will now be submitted of the quality requirements which are necessary for the successful application of amyloglucosidase in the practice of this invention. Certain testing procedures will be given so as to provide means for better evaluating some of the significant features of this invention.

*Amyloglucosidase units.*—These are determined by hydrolyzing starch with a known quantity of the enzyme under conditions optimum for amyloglucosidase activity. The results are expressed as grams of dextrose (D) in the hydrolysate, minus the reducing value of the original starch sol (calculated as dextrose), (S), divided by three times the number of grams or cc. (E) of the enzyme preparation used:

$$\text{Amyloglucosidase Units} = \frac{D-S}{3E}$$

In order to provide a convenient laboratory method to determine amyloglucosidase units of activity, the time of hydrolysis arbitrarily is limited to a set value of 180 minutes. Accordingly, the amount of enzyme added in the test is limited to an amount considerably less than that amount which would hydrolyze the starch sample completely in this time.

For the test hydrolysis, five grams of Lintner's soluble starch are heated in about 50 cc. of water until solution is complete. Acetate buffer is added to adjust the solution to pH 4.0. The solution is then made up to a volume of 100 cc. at 60° C. and a small carefully measured quantity of the enzyme is added. After exactly 180 minutes at 60° C. an aliquot is removed and dextrose is determined, as for example, by the well known Schoorl method, calculating the reducing value as dextrose. A similar determination is run on another identically prepared starch solution, except that no enzyme is added.

As above indicated, given a longer hydrolysis time, the enzyme addition can usually hydrolyze more starch to dextrose than is indicated by the Amyloglucosidase Units test. Thus, for example, an amyloglucosidase sample containing one unit of activity will ordinarily hydrolyze actually about 5 to 10 grams of starch almost completely to dextrose if given sufficient time, e.g., about 48 to 72 hours, and particularly if more concentrated solutions of starchy substance are used for the hydrolysis.

*Transglucosidase activity.*—This is determined by measuring the amount of non-fermentable products synthesized under conditions favorable for transglucosidase and amyloglucosidase activities, using maltose as the initial substrate.

Twenty grams of pure maltose are dissolved in 39 cc. of water to which are then added 5 cc. of a normal sodium acetate-acetic acid buffer at pH 4.0. An amount of enzyme preparation is added which contains 2 units of amyloglucosidase activity and the mixture is allowed to react for 72 hours at 60° C. The reaction flask is then placed in a boiling water bath for 15 minutes, cooled, adjusted to pH 4.8 with normal sodium hydroxide and diluted to about 200 cc. Ten grams of dry yeast are added and the mixture is fermented for 3 hours at 30° C. The fermentation mixture is then made up to a volume of 250 cc. and then centrifuged to remove the yeast. Then 50 cc. aliquots are heated with 5 cc. of about 9 N HCl in a boiling water bath for 3 hours in order to hydrolyze the non-fermentable di- and polysaccharides to dextrose. The hydrolyzate is neutralized with NaOH and made up to 100 cc. in a volumetric flask. Dextrose is determined, as by the Schoorl method.

A control is also run, adding none of the enzyme preparation under test and no maltose, but using 20 grams of dextrose instead of the maltose.

The dextrose value found after acid hydrolyzing the yeast fermentation liquor, minus the dextrose value found in the control, gives the amount of non-fermentables synthesized by transglucosidase that is in the aliquot. From this the total amount of non-fermentables can be calculated. This value, divided by 2, is the transglucosidase activity in the enzyme preparation, in grams of non-fermentables synthesized per unit of Amyloglucosidase.

*Dextrose equivalent (D.E.).*—This is total reducing sugars calculated as dextrose. It is determined here by a modified Fehling Test, such as described by W. J. Fetzer, Analytical Chemistry, vol. 24, pp. 1129–1137 (1952).

*True dextrose.*—By this is meant the actual percentage, dry basis, of dextrose. A suitable method is described by Sichert and Blyer, Z. Anal, Chem., vol. 107, pp. 328 et seq. (1936).

As will be pointed out more specifically with reference to the working examples the amylaceous materials which are operable as starting materials for the instant invention may be selected from a broad class of either purified or crude starchy products. For example, refined corn or wheat starch may be used, as well as potato starch, sweet potato starch, or like materials. Crude starches from the corn, wheat or potato source may also be used. Various streams from both wet and dry corn milling processes may be used as a starting material for the instant invention. These streams include such materials as starch liquors, hominy feed, hominy grits, ground whole corn, corn flour, brewer's grits or wet cereal milling plant fractions such as Dorrcone centrifuge streams, Clarifier under-flow and de-germed primary mill stream slurries. Various other crude starchy materials with which the art is familiar may likewise be used.

It is essential in the practice of this invention that the starch granules are in such form that the amyloglucosidase can contact and attack the starch molecule to convert it to the dextrose molecule. In some instances this rupturing of the sarch granule may be brought about by prior manufacturing operations. Then the amyloglucosidase enzyme may be mixed directly with the amylaceous material. It is preferred however, to insure the availability of the starch molecule to action by the amyloglucosidase by a pre-treatment step which involves contacting the amylaceous material with a liquefying enzyme such as a protease-free amylase under conditions that will insure rupture of the starch granule.

This operation referred to as liquefaction, is accomplished by contacting the amylaceous material with an amylase enzyme, for example, at a temperature within the range of from about 140° F. to about 195° F., for from about 20 to 40 minutes. Although this liquefaction step may be carried out in an agitator vessel equipped with means for temperature control, it also may be accomplished in a flash sterilizer, a Votator, or in other equipment which is known to the art. It has been found that use of higher temperatures decreases the holding time substantially. Care should be taken, however, not to raise the temperature of the liquefaction step to one which causes inactivation of the liquefying enzyme. The liquefaction step is preferably carried out at a pH of within the range of 6.5 to 7.5.

The amount of liquefying enzyme utilized will depend upon the potency of the material used. Ordinarily from about 0.06% to about 0.15% by weight based on the weight of the dry solids in the amylaceous material is satisfactory when the liquefying enzyme has a potency expressed in milligram equivalents of starch conversion to moltose under standard conditions of from about 40 to 100.

If it is found desirable to use the liquefaction step, such liquefying enzymes are preferably inactivated prior to the subsequent treatment with amyloglucosidase. This may be done by heating to a temperature sufficient to inactivate the liquefying enzyme, for example, to about 210° F.

Conversion of the liquefied amylaceous material to dextrose is brought about by contact with the amyloglucosidase enzyme system under conditions which are conducive to this conversion. This conversion is commonly referred to as the saccharification step. The temperature of the liquefied material is adjusted to one within the range of from about 130° F. to 145° F., and the pH adjusted to between about pH 4.0 to pH 5.5. There is then added to the liquefied mixture sufficient amyloglucosidase to convert the starch present to dextrose. The amount of enzyme added will again depend upon enzyme potency. Normally from about 0.05% to 0.10% by weight, based on the weight of the dry solids in the original mixture, is sufficient. Contact between the liquefied starch and the amyloglucosidase enzyme system is maintained for about 45 hours to 90 hours and the temperature controlled to one within the range of from about 130° F. to 145° F.

After the conversion of the starch to dextrose is substantially completed the mixture may then be filtered to remove solids and the resulting filtrate containing the dextrose solution may be further purified and concentrated to a water content of between 25 and 16 percent prior to crystallization to recover the dextrose in solid form or the dextrose solution may be used directly in any of the numerous industrial applications with which the art is familiar.

The following examples are included for the purpose of illustrating my invention.

*Example 1.—Refined dry amyloglucosidase powder— use of fuller's earth*

To one liter of a filtered, submerged culture of *Aspergillus niger* containing 2300 amyloglucosidase units was added 50 grams of fuller's earth. The mixture was stirred and the pH of the mixture was adjusted to pH 4.0 with hydrochloric acid. After stirring for 30 minutes, the mixture was filtered and evaporated under reduced pressure at 40° C. to a volume of 200 cc. 400 cc. of isopropanol was added and the mixture stirred vigorously and allowed to stand until a gummy precipitate formed. This precipitate weighing 30 grams, which contained the purified amyloglucosidase, settled to the bottom of the container.

The 30 grams of isolated amyloglucosidase concentrate was blended with 150 grams of dry, powdered cornstarch and mixed until a damp, friable product resulted. This product was then air-dried and ground to produce a light colored, free-flowing powder that weighed 180 grams. Accordingly, 0.18 gram of the powdered amyloglucosidase product represented 1.0 cc. of the original culture.

*Example 2.—Refined liquid amyloglucosidase— use of fuller's earth*

Thirty grams of gummy precipitate obtained as in Example 1 was dissolved in 100 cc. of water. The resulting solution was filtered and placed in a refrigerator.

This amyloglucosidase preparation contained about 90 percent of the amyloglucosidase activity of the original culture liquor. It was substantially free from protease, lipase and transglucosidase activities.

*Example 3.—Refined amyloglucosidase solution— use of magnesium silicate*

An amyloglucosidase preparation substantially free from protease, lipase, transglucosidase, and other carbohydrases such as alpha-amylase and beta-amylase was prepared as follows: 20 grams of magnesium silicate sold under the trade name of Magnesol was added to one liter of a filtered, submerged culture liquor of *Aspergillus niger* at pH 4.0. The mixture was stirred at room temperature for 30 minutes, and filtered. The clear filtrate was evaporated at pH 4.0 under vacuum at 35° C. to 40° C. to a volume of 500 cc. An equal volume of acetone was added with vigorous stirring at room temperature.

The mixture was allowed to stand until a precipitate formed. The precipitate was dissolved in 250 cc. of water and filtered. To this liquor was added an equal volume of acetone and the stirred mixture centrifuged. The sediment was discarded. 1.0 gram of sodium chloride was added to the clarified liquor and the mixture stirred until the salt was dissolved. The solution was allowed to stand until a flocculant precipitate formed.

The mixture was centrifuged and the clear liquor discarded. The precipitate was mixed with 100 cc. of water and centrifuged. The clear water-white solution contained the purified amyloglucosidase. This refined amyloglucosidase solution was placed in a refrigerator until used.

*Example 4.—Refined amyloglucosidase solution—use of bentonite clay*

4.0 grams of bentonite clay was added to one liter of filtered, submerged-culture liquor of *Aspergillus niger*. The mixture was stirred and the pH maintained within the range of about pH 3.8 to pH 4.3 by adding hydrochloric acid. After 30 minutes of stirring the mixture was centrifuged. The clear centrifuged liquor contained from 90 to 95 percent of the original amyloglucosidase activity, whereas about 90 percent of the transglucosidase activity was removed by the bentonite clay.

*Example 5.—Preparation of isolated amyloglucosidase*

One liter of a crude fungal extract produced by means of an *Aspergillus niger* culture in accordance with procedures known to the art containing 2300 amyloglucosidase units was subjected to a refining and isolation treatment according to Example 1.

Amyloglucosidase activity units were determined on the dry powdered product according to the procedure hereinabove given, using 0.20 gram of the powder per 5 grams of soluble starch. The amyloglyucosidase activity was found to be 13.8 grams per gram of the powdered product. That is to say, one gram of the powdered enzyme product was calculated to contain 13.8 amyloglucosidase units, which is equivalent to saying that one gram of the powdered product could produce in this test 13.8 grams of reducing sugar calculated as dextrose.

The absence of harmful amounts of transglucosidase was shown in the following test: A sample of 50.0 grams, dry basis, of Lintner's soluble starch was dissolved in sufficient water, by heating, to give a 35.0% solution at pH 4.0, to which was added 0.45 gram of the powdered enzyme preparation at 60° C. Hydrolysis was continued at 60° C. for 72 hours. The hydrolyzate at this time was found to have a pH of 4.1. It was filtered, heated in a boiling water bath for 15 minutes and cooled. The D.E. was determined by the Schoorl test on an aliquot of the hydrolyzate and true dextrose was determined by the method of Sichert and Bleyer. The D.E. was found to be 94% and true dextrose, 92% dry basis. Obviously, as will be demonstrated by specific test subsequently, little if any transglucosidase was present in the processed enzyme preparation since the D.E. found was only 2% more than the percentage of true dextrose present; that is, very nearly all of the reducing sugars in the hydrolyzate was actually dextrose.

Quite in contrast, when an identical hydrolysis procedure was carried out using an equivalent amount of the original crude extract to hydrolyze the starch, then after 72 hours at 60° C., the hydrolyzate analyzed 90 D.E. and only 82.0% true dextrose, dry basis. Therefore, 8% less true dextrose actually resulted when the crude extract was used, and from the much wider spread between D.E. and true dextrose values than when the processed enzyme was used, it is apparent that a very large part of this 8% loss in dextrose yield was due to production of synthetic sugars from dextrose by transglucosidase in the crude extract.

This last test also shows the apparent gain in amyloglucosidase activity merely by processing the enzyme preparation.

This last test shows furthermore that 0.45 gram of dry enzyme powder was able to produce 45 grams of true dextrose (from 50 grams of starch). Inasmuch as 0.45 gram of the enzyme powder contained 6.21 amyloglucosidase units, then one unit of this powder was able to produce very nearly 9 grams of dextrose, when given sufficient time and a higher substrate concentration (35%) than is used in the amylglucosidase units test, described hereinabove. Actually, therefore, the dry enzyme powder (which is mostly inert carrier of starch in granule form) can hydrolyze about 100 times its weight of dissolved starch to dextrose.

Transglucosidase activity was determined on the dry powder enzyme product by the procedures hereinabove given. The value found was only 0.03 gram of non-fermentable substance per amylglucosidase unit; in contrast, the crude original extract had a transglucosidase activity of 0.18 gram of non-fermentable per amylglucosidase unit. This six-fold difference in transglucosidase activity readily explains the 8% lesser dextrose yield in using the crude extract to hydrolyze starch. For if only a little more than half of the non-dextrose reducing sugars were synthetic non-fermentables when the isolated amyloglucosidase was used (or about 1.2%), then six times this value, or 7.2% of synthetics, plus about 0.8% of "natural" non-dextrose reducing sugars, would account for 8% lesser dextrose yield.

Substantially no protease or lipase activity was found in the processed, dry enzyme powder, when it was tested by the usual procedures known to the prior art.

My invention enables for the first time, the introduction of in situ dextrose into a starch-containing food product, without modifying or changing in any way the non-starch ingredients of the said food. In some cases, it may be desirable to convert only a minor portion of the starch in the food to dextrose. In other instances, certain advantages are created by subjecting the starchy food to amyloglucosidase converting conditions wherein all, or a major portion of the starch in the food, is converted to dextrose. The particular degree of dextrose conversion will depend on the ultimate end-use which is intended for the said enzyme-converted food.

In the case of amylaceous products which contain enzymes emanating from either the growing, harvesting, or steeping of these materials, the said products, before amyloglucosidase conversion, can either be subjected to a sufficiently high temperature to destroy these natural enzymes, or treated directly with amyloglucosidase without any predestruction of the natural enzymes. The particular sequence of any amyloglucosidase treatment will depend upon the nature of the ultimate end-product after the amyloglucosidase treatment. Thus, in the case of bread dough, it is inadvisable to preheat the wheat flour to a temperature that would destroy the natural enzymes of the wheat. In the case of corn or rice for use as raw material for finished slab dextrose sugar, it is important to destroy all the natural enzymes in these cereals before proceeding with the amyloglucosidase treatment.

Examples of edible amylaceous products which can be advantageously subjected to my enzymatic in situ producing process as described above are various products of the dry cereal milling industry, wet corn milling products, vegetables and starchy fruits. Some specific examples of the above generic types of food products which could be advantageously subjected to the processes of this invention are wheat flours, rice, tapioca, whole ground cereals such as corn or barley; cornmeals, hominy feed, and various wet corn milling industry fractions, such as mill starch, corn gluten, gluten meal, squeezer slop and various millstream fractions such as Merco centrifugal liquors, or starch liquors going to or coming from Dorrcone equipment. Crude corn sugar liquors, corn syrups or malt syrups may also be advantageously subjected to a treatment with amyloglucosidase which is free of transglucosidase, protease and lipase.

For the attainment of food products of enhanced dextrose content, fruits, or vegetables, after proper comminuation or fragmentation, may be blended into a water slurry of finely ground cereals, degerminated cereals, refined starch, or mixtures thereof. A subsequent refined amyloglucosidase conversion, followed by suitable dehydration, will result in a dry food comprising in situ dextrose intimately blended with the non-dextrose solids of the said vegetables or fruits.

*Example 6*

A wet cornmilling crude starch liquor fraction coming from the Merco centrifugal of the millhouse and containing 2.0% of protein, based upon the dry starch content of said liquor, was subjected to a centrifugal washing treatment in a Dorrcone centrifugal of the type now in common use in the wet corn milling industry. The washing was done with warm, 130° F. fresh water, and was sufficient to remove the major portion of water-soluble impurities which contribute towards deleterious taste and flavor effects when such a millhouse starch product is intended for food end-use purposes.

The washed Dorrcone starch liquor was adjusted to a starch content of 35% and then blended with 0.1%, based upon dry starch content, of a protease-free liquefying amylase, i.e., a liquefying amylase which is free of protease activity at starch pasting and liquefaction temperatures, such as the product produced by Miles Laboratories, Inc., under the trade name of HT-440.

The starch liquor was then heated to a sufficient temperature to paste the corn starch and cause a substantial liquefaction of the said paste, with a minimum of saccharification. The resulting liquefied starch paste was then heated to a boil to inactivate the liquefying amylase, cooled to 140° F., and the pH adjusted to 4.1. A blend of amyloglucosidase syrup and starch, produced as described in Example 1, was then added to this paste in an amount corresponding to 1.0%, based upon the dry starch content of the paste.

The amyloglucosidase was allowed to act upon the above paste under the said temperature and pH conditions for a period of 90 hours. This resulted in the conversion of 96% of the starch to dextrose. This liquor was adjusted with soda ash to pH 5.0 and centrifuged. The resulting dextrose liquor was vacuum concentrated to a water content of 17%. The concentrated liquor was then poured into a seeding tank containing 3% of dextrose hydrate crystals. The batch was thoroughly blended, cooled in two hours to 100° F., and poured onto a concrete floor to a depth of six inches. The concentrated mass of dextrose liquor was allowed to cool and cure at room temperature. This resulted in the production of a solid slab of high quality dextrose hydrate sugar which was free of bitter tasting dextrose impurities.

In contrast to the old slab corn sugars known to the prior art and produced from refined corn starch by means of acid hydrolysis, my new type of slab corn sugar, when tested in accordance with the analytical procedures submitted in this specification, was found to be substantially free of gentiobiose, panose, other poor tasting or non-fermenting sugars, or protein breakdown products caused by enzymatic degradation.

When ground to a fine mesh, the above slab sugar was found to be a pleasant tasting material which could be substituted for isolated crystalline sugars such as dextrose or sucrose in many end-uses wherein the slab or chip corn sugar known to the prior art was incapable of acceptance as a crystalline sugar substitute.

The absence of carbohydrate polymers in the concentrated dextrose liquors produced by my process, minimizes dextrose crystallzation retardation caused by inhibiting colloids, and enables a much more rapid crystallization and concomitant slab formation of my improved slab corn sugar product.

It is preferable to use a small amount of protease-free liquefying amylase before applying the amyloglucosidase to the starch paste. The liquefying step enables the use of starch pastes of greater dry substance content, and therefore lowers vacuum pan dehydrating costs. However, one may, if so desired, paste the starch without any anzymatic liquefaction treatment, and subject said paste upon cooling to about 140° F., to the amyloglucosidase treatment.

The amount of dextrose added for crystal seeding per pound will vary, depending on the amount of non-dextrose ingredients, the non-dextrose solubles, and the rate of cooling of the blend with the concentrated dextrose liquor. With pure starch as the amyloglucosidase substrate, little or no dextrose seed would be required, depending upon the time allowed for slab sugar formation.

In general the protease-free amylase treatment may be accomplished at a temperature within the range of about 140° F. to 195° F. in about 20 to 40 minutes and at a pH of preferably from about 6.5 to 7.5. Following liquefaction, the liquefied starch solution is generally cooled to a temperature within the range of about 130° to 145° F. and the pH adjusted to about from pH 4.0 to pH 5.5. The amyloglucosidase conversion may be effectively conducted at temperatures in the range of about from 130° F. to 145° F. and in about 45 to 90 hours.

*Example 7*

A wheat flour containing 12 percent protein was subjected to a dry milling sifting and aspirator procedure under conditions which resulted in the production of a wheat flour containing 2.2 percent protein.

The low protein content wheat flour was suspended with sufficient cold water to produce a 35 percent starch milk. The resulting starch liquor was then blended with 0.1 percent, based upon dry flour content, of the HT-440 liquefying enzyme, and subjected to rapid liquefying treatment in a Votator under conditions wherein the starch liquor was heated to 190° F. in 30 minutes. The paste was then held at 190° F. for 10 minutes, heated rapidly to 210° F., cooled to 140° F., and then subjected to the same amyloglucosidase and crystallizing conditions as that described in Example 6.

Upon grinding the resulting slab wheat dextrose to a fine powder, there was obtained a pleasant tasting sugar product which also had within it the flavoring effects of the non-modified, non-starch constituents of the low protein wheat flour.

This type of wheat sugar product is suitable for end-uses involving the use of isolated crystalline sugars such as sucrose or dextrose, in conjunction with various types of wheat flours or doughs.

Because of the low protein content of the above wheat flour, it is possible to readily paste the flour and to process the resulting paste with amyloglucosidase, without inviting difficulties from lumping or doughing effects caused by the presence of normal amounts of wheat gluten in wheat flour.

With proper facilities for overcoming the pasting and dehydrating difficulties caused by the presence of wheat gluten, a regular wheat flour with normal protein can also be processed into a slab wheat sugar product.

*Example 8*

Ground whole corn was mixed with sufficient water to produce a slurry containing 33 percent of dry substance. The starch was rapidly liquefied with protease-free alpha amylase in a continuous paster, such as a Votator, and heated to 210° F. The hot liquefied paste was cooled to 140° F. and was adjusted to pH 4.0. The paste was converted with amyloglucosidase under the same conditions as described in Example 6.

During the conversion, some of the corn oil in the corn was liberated and floated on top of the slurry. After the dextrose conversion, the liquor was adjusted to pH 5.0 with soda ash.

The liberated corn oil was skimmed off and the crude dextrose liquor containing suspended protein, germ and fibre material was centrifuged. Centrifuged liquor was then dehydrated and subjected to slab sugar formation as described in Example 6. The residue obtained from the centrifuging consisted of a material of high protein content. This material was valuable for upgrading the protein content in corn gluten feed or in other animal feed products.

The slab corn sugar obtained from the centrifuged liquor had taste and fermentability qualities similar to that obtained from the Merco starch liquor described in Example 6.

Since ground corn is a cheaper starting material, the slab sugar obtained in accordance with this example is a lower cost product which can be used to advantage by the brewing industry in place of crude corn grits.

In this example the solubles present in the original whole corn end up in the slab sugar. These solubles contribute toward certain flavor effects which, with some food end-uses, are favorable. However, where the prime objective is maximum in situ dextrose content with a minimum of non-dextrose solubles, it is preferable to start with an amylaceous raw material in the solubles of which have been removed before the amyloglucosidase treatment.

*Example 9*

Hominy feed was suspended in warm, 130° F. water, stirred for 30 minutes, and centrifuged. The washed centrifuged cake, free of its corn solubles, was resuspended in fresh water and subjected to the treatment described in Example 8.

There resulted a slab corn sugar, the taste of which was not affected by the water soluble ingredients present in the original corn kernel.

*Example 10*

In a dry corn milling plant, the stream or channel of hominy grits intended for hominy feed production was removed before the incorporation of corn germ and corn bran fractions which are commonly added to the hominy grits to produce hominy feed.

The said hominy grits were then subjected to the same treatment as that described in Example 8, with the exception of the omission of the centrifuging of the dextrose liquor resulting from the amyloglucosidase conversion of the starch into grits.

There resulted a low cost, converted corn grits product which is particularly suitable as a replacement for either crude corn grits or refined corn starch grits which are now being used by the brewing industry. The advantage of my new type of modified brewer's grits are lower cost coupled with maximum solubles extract and maximum yeast fermentation efficiency.

The product produced per this example has similar advantages when used in other fermentation industries, such as vinegar, alcohol, or lactic acid.

In the case of intended end-uses wherein the water solubles present in the untreated hominy grits are undesirable, the hominy grits can be subjected to a preliminary warm water wash and centrifuging step to remove the said solubles. For such procedure, the preferred arrangement is to have the hominy grits processed in the millhouse of a wet corn milling plant. This enables the extracted solubles from the hominy grits to be processed into corn gluten feed, steep water, or gluten meal channels, thereby obviating the need for taking an economic loss on the solubles removed from the hominy grits. In place of a wet corn milling plant, similar advantages would accrue by having the hominy grits processed in a yeast manufacturing plant, alcohol or whiskey distilleries, or sugar manufacturers, such as cane or beet sugar refineries.

*Example 11*

A wet corn milling liquor coming from the Dorrcone centrifugal of the millhouse, and intended as the starting starch material for corn syrup production, was subjected to the same treatment as that described in Example 6, with the exception that the concentrated dextrose liquor in the vacuum pan was not crystallized into slab sugar, but instead of this, was blended with a sufficient amount of commercial, refined, invert sugar to prevent the dextrose from crystallizing in a degree sufficient to cause the formation of a solid slab sugar.

The resulting product was a thick syrup comprising dextrose and levulose, and was free of maltose, dextrins, retrogradation dextrose polymers and enzymatic protein breakdown products. My improved syrup form dextrose product makes possible the use of dextrose in various food products without the need for first isolating the dextrose in crystalline form, drying the said crystals and then redissolving the said dried crystals to produce a dextrose solution.

*Example 12*

A refined corn syrup was mixed with sufficient water to increase the water content of the syrup to 40 percent. The water used for the addition to the corn syrup was first blended with a sufficient amount of amyloglucosidase product of the kind described under Example 1, to represent 1.0 percent of the non-dextrose carbohydrate content of the corn syrup. The diluted corn syrup was adjusted to pH 4.0 and allowed to stand at room temperature. After standing for 30 days, the non-dextrose carbohydrates in the corn syrup were converted to dextrose, and a solid mass of dextrose sugar resulted.

This solid dextrose sugar contained whatever gentiobiose is commonly present in refined corn syrup produced by the acid hydrolysis of corn starch. However, by starting with corn syrup as the amyloglucosidase substrate, it becomes possible to eliminate the color formation induced by a prolonged amyloglucosidase conversion at 140° F. and to also eliminate the presence of liberated fatty acids emanating from the small amount of fatty acids which are known to be present in a chemically attached form in corn starch. The fatty acids appear in a form of what is known in the wet corn milling trade as "refinery mud."

To obtain a dextrose syrup similar to that described in Example 11, but free of "refinery mud" and substantially free of coloring matter, the diluted corn syrup of the present example may be blended with refined liquid invert sugar just prior to the time when the amyloglucosidase creates a sufficient amount of dextrose to cause solidification.

The exploitation of my corn syrup amyloglucosidase treating procedure can be advantageously used by candy manufacturing plants, by storing corn syrup in tanks, subjecting this syrup to the said amyloglucosidase treatment, and then producing the required batch of dextrose liquor by leaching the solidified solid dextrose sugar resulting from the enzymatic treatment of the corn syrup, with hot water, and adjusting the pH of the sugar solution to pH 4.8.

To accelerate dextrose crystallization in the amyloglucosidase treated corn syrup, the batch may be blended with some ground slab dextrose produced from previous batches or with pure, crystalline dextrose hydrate or anhydrous dextrose.

The dextrose product obtained per this example still contains the dextrose polymers created by the reversion action of dextrose during the acid hydrolysis treatment of the corn syrup. This product, therefore, cannot approach as closely the taste qualities of isolated crystalline dextrose as is possible by using pure corn starch as the amyloglucosidase substrate. However, this solidified dextrose obtained from corn syrup can be used in many confectionery, ice cream, canning, and other food uses wherein the small amount of dextrose impurities present in this amyloglucosidase converted corn syrup are insufficient to seriously interfere with the ultimate taste and flavor of the finished food.

If it is desired to obtain a corn syrup more amenable to subsequent dextrose formation without parallel transglucosidase formation a diastatically prepared syrup may be used. Thus, a water-washed degerminated corn meal is subjected to an in situ amylase conversion to produce a refined syrup consisting of maltose, dextrins and some dextrose. This can be used by large dextrose consumers such as bakers or confectioners to convert the said syrup entirely to dextrose by continuing the refined amyloglucosidase conversion.

The unique ability of isolated amyloglucosidase to function in concentrated carbohydrate solutions is what makes possible the treatment of corn syrup at high carbohydrate concentration. This, together with the ability of amyloglucosidase to function tangibly at low temperatures, such as 60° F., makes it possible to develop a process wherein convertable dextrose polymers are changed to dextrose by amyloglucosidase under cost-saving processing conditions.

*Example 13*

A refined corn starch which had been thoroughly washed with warm, 130° F. fresh water to remove substantially all of the water soluble impurities, was resuspended in fresh water at a starch concentration of 35 percent. To this slurry of highly refined starch, there was added 0.1 percent, based upon dry starch content, of the HT-440 liquefying enzyme, described in Example 6. The blended slurry was then subjected to a rapid paste liquefying treatment in a continuous paster of the Votator type under conditions wherein the starch liquor was heated to 190° F. in 30 minutes. The paste was then held at 190° F. for 10 minutes, heated rapidly to boiling to inactivate the enzyme material, and cooled to 140° F.

The cooled paste was adjusted to pH 4.0 and 1.0 percent of the amyloglucosidase enzyme preparation, described in Example 1 was added. The paste was then converted for 90 hours at 140° F. This produced a liquor analyzing 97.1 percent D.E. and 95.5 percent actual dextrose content.

The pH of the resulting dextrose liquor was adjusted with soda ash to pH 4.9, and an amount of Darco decolorizing carbon corresponding to 1.5 percent of the dextrose content was added to the liquor. The liquor was heated to 150° F. and after a 30 minute stirring of the decolorizing carbon suspension was filtered and the filtrate vacuum concentrated to a water content of 16 percent. The concentrated liquor was seeded with 1.0 percent of dextrose hydrate and thoroughly blended. The seeded liquor was cooled to room temperature and then poured into cotton bags. Upon standing at room temperature for a period of 12 hours, the dextrose sugar in the cotton bags solidified into a solid cylindrical mass.

These cylindrical masses of bagged solid dextrose were then used at a sugar-consuming plant, such as a candy factory, by rolling the cylindrical bags of dextrose into tanks containing fresh hot water, and allowing the hot water to dissolve out the dextrose from the cotton bags. The leached-out cotton bags were then recovered from the sugar solution tank, dried, and were then ready for re-use for the formation of other cylinders of solid dextrose.

The product obtained in accordance with this example is one the quality of which approaches that of pure crystalline dextrose hydrate from the standpoint of taste as well as fermentability.

By practicing the process of this example, my invention makes possible the production of a substantially pure dextrose hydrate product without resorting to the much more expensive procedures that are necessary for the production of isolated crystalline dextrose from acid-converted starch liquors. My process eliminates acid conversion in pressure cookers, long periods of dextrose crystallizing in expensive sugar crystallizer equipment, sugar centrifuging of the crystals, and sugar driers to dry the crystals.

The absence of transglucosidase in my enzyme converting procedure makes possible the production of a solid, slab dextrose product, the actual dextrose content of which is substantially greater than heretofore possible. Since the higher the dextrose content, the lower the amount of non-dextrose impurities, the ability to produce, with my process, a product containing over 95 percent of actual dextrose, enables the creation of an insitu dextrose hydrate having taste and color qualities approaching that of isolated crystalline dextrose.

The absence of any substantial amounts of non-dextrose polymer material makes possible, with my process, a radical reduction in the time needed for solidification to rigid slab form. The crude slab dextrose products of the past required several days of curing before a rigid slab was obtained. In contrast, my process enables slab formation in a few hours. To reduce the slab formation time still farther, the cotton bag used to form the cylinders of slab dextrose, should be equipped with a series or nest of aluminum water-cooling coils. Upon circulating a cooling liquid through the said cooling coils, the time for producing a solid cylindrical slab of dextrose in the cotton bag may be reduced to as little as two hours.

In place of cotton bags, any flexible polymer fibre container capable of easy hot water penetration, and being inert toward hot sugar solutions, can be used for the production of cylindrical slabs of sugar from other amylaceous materials, such as degerminated corn and other cereal products.

In a brewery, the use of a portabrle, rollable, cylindrical slab of dextrose made from degerminated corn in accordance with my procedure, enables a greatly simplified handling of fermentable carbohydrates by the brewer and eliminates the moving of large volumes of dusty corn grits by means of expensive grain handling equipment.

*Example 14*

100 grams of wheat flour were suspended in 500 cc. of 77° F. water. The resulting aqueous wheat flour suspension was adjusted to pH 4.5 by means of phosphoric acid. There was then added to this pH adjusted wheat flour suspension 1.0 gram of an amyloglucosidase enzyme having a potency of 13.8 amyloglucosidase units per gram. This enzyme was prepared in accordance with the procedure outlined in Example 1.

The enzyme was allowed to act on the above wheat flour suspension at 77° F., with constant agitation, for a period of 3 and 5 hours, respectively. The dextrose content of the enzyme-modified wheat flour was determined at the end of each of the above said converting times.

It was found that, after 3 hours, the enzyme-treated wheat flour had 3.4 percent dextrose, and that after 5 hours the wheat flour contained 4.3 percent dextrose, both dextrose figures being based upon a moisture free wheat flour.

*Example 15*

Five parts by weight of wheat flour were suspended in 100 parts by weight of water and the mixture pasted by heating to 190° F. The hot paste was then cooled to 77° F. and there was added 0.05 part by weight of amyloglucosidase enzyme having a potency of 13.8 amyloglucosidase units per gram. The mixture was allowed to convert for 6 hours at 77° F. After this converting time the pasted wheat flour, on an original moisture-free dry flour basis, contained 5.4 percent dextrose.

65 parts by weight of the above dextrose-containing dilute pasted wheat flour was then used as the source for water and sugar in a white bread formula based upon the following proportions of ingredients:

| Ingredient: | Percent on flour basis |
| --- | --- |
| Flour | 100 |
| Pasted wheat flour liquor containing dextrose | 65 |
| Amyloglucosidase enzyme | 0.5 |
| Yeast | 2 |
| Yeast food | 0.4 |
| Non-fat milk solids | 5 |
| Shortening | 4 |

The above white bread formula was then used in a regular sponge dough method baking procedure wherein the fermentation time was four hours and fermentation temperature was 77° F.

It was found that under the above conditions the total amount of dextrose sugar created in situ was 5.8 percent based upon weight of the commercial flour. This is about the same amount of sugar, particularly the commercial crystalline, refined dextrose hydrate sugar, which is commonly added by commercial bakers for the purpose of acting as a yeast food during the fermentation time.

In Examples 14 and 15, in situ dextrose production was created in the wheat flour under temperature, pH, and fermenting time conditions which correspond to the conditions prevailing in commercial bread baking. This enables dextrose production for the yeast fermentation without interfering with the regular bread baking procedure.

In Example 14, where the amylogucosidase was added to ungelatinized wheat flour, the ability of the enzyme to create dextrose from ungelatinized material is unique. The reasons for this unusual amyloglucosidase action are not completely understood, but it is presumed that commercial wheat flour, during the dry milling process, has some of the wheat starch granules subjected to sufficient mechanical disintegration to enable in situ production of dextrose by the enzyme.

Instead of bread, my in situ dextrose procedure may be similarly applied to other bakery products, such as cakes, sweet rolls, doughnuts, and the like.

It will be appreciated by those skilled in the art that many modifications can be made without departing from the principles formulated by this invention. The dextrose-producing enzyme need not be limited to amyloglucosidase obtained from fungal sources. Any amylase which is free of protease, lipase, and transglucosidase, and which has the property of producing exclusively dextrose from starch is applicable to this invention. For the paste-converting conditions for dextrose production, the pH can vary from pH 3.5 to pH 7.5, the temperature from as little as 50° F. to 170° F., and the converting time from a few minutes to several days, depending upon the degree of dextrose production and the kind of finished product which is desired.

For the enzymatic production of the non-solidifying dextrose syrup, the addition of invert sugar can be replaced by any edible colloid capable of dextrose crystallization retardation.

The slabs or cylinders of solidified dextrose may have incorporated within them, before solidification, other food products, such as flavoring materials, milk solids, egg solids, or the like. Such blends are suitable for certain candy, bakery, and similar food product operations.

The procedure described for obtaining cylindrical bags of solid dextrose from a solidifiable massecuite, is applicable to other sugars such as sucrose, lactose, or maltose, and the like.

In view of the foregoing disclosure, those skilled in the art will be able to practice the invention either by following the embodiments given or such other embodiments or modifications of the invention as will be apparent. Accordingly, all matter disclosed above is intended to be interpreted as illustrative and not in a limiting sense.

What is claimed is:

1. A process for the prepartion of dextrose from a crude starch containing amylaceous material containing protein and fat, which comprises the steps of subjecting said crude starch material to the action of a protease-free amylase under liquefying conditions to liquefy substantially all the starch in said crude starch material, adding to the liquefied mixture an amyloglucosidase which is substantially free from protease, lipase and transglucosidase activity, and converting the starch in said crude amylaceous material to dextrose by means of said amyloglucosidase.

2. A process for the preparation of dextrose from a crude starch containing amylaceous material containing protein and fat which comprises the steps of subjecting said crude starch material to the action of a protease-free amylase at a temperature within the range of from about 140° F. to 195° F. for from 20 to 40 minutes and at a pH of from 6.5 to 7.5 to liquefy substantially all the starch in said crude material, cooling the liquefied mixture to a temperature within the range of from about 130° F. to 145° F., adjusting the pH of said liquefied mixture to one within the range of pH 4.0 to pH 5.5, adding thereto an amyloglucosidase which is substantially free from protease, lipase and transglucosidase activity, and maintaining said mixture at a temperature within a range of from about 130° F. to 145° F. for from about 45 to 90 hours with mild agitation to convert said starch to dextrose.

3. A process for the preparation of dextrose from a crude starch containing amylaceous material containing protein and fat, which comprises the steps of subjecting said crude material to the action of a protease-free liquefying amylase under liquefying conditions to liquefy substantially all of the starch in said crude material, subjecting the liquefied mixture to the action of an amyloglucosidase which is substantially free from protease, lipase and transglucosidase activity so as to convert the liquefied starch to liquid dextrose solution, separating said dextrose solution from the insoluble portions of said mixture, concentrating said dextrose solution, and crystallizing dextrose from said dextrose solution.

4. A process for the prepartion of dextrose from a crude starch containing amylaceous material containing protein and fat, which comprises the steps of subjecting said material to a water washing treatment to remove water soluble constituents thereof, subjecting the washed crude material to the action of a protease-free liquefying amylase under liquefying conditions to liquefy substantially all of the starch in said crude material, subjecting the liquefied mixture to the action of an amyloglucosidase which is substantially free from protease, lipase and transglucosidase activity so as to convert the liquefied starch to liquid dextrose solution, separating said dextrose solution from the insoluble portions of said mixture, concentrating said dextrose solution, and crystallizing dextrose from said dextrose solution.

5. A process for the preparation of dextrose which comprises subjecting a wet cornmilling crude starch fraction to a water washing treatment to remove water soluble constituents thereof, subjecting said washed crude starch fraction to the action of a protease-free liquefying amylase under liquefying conditions to liquefy substantially all of the starch in said crude starch fraction, subjecting the liquefied mixture to the action of an amyloglucosidase which is substantially free from protease, lipase and transglucosidase activity so as to convert the liquefied starch to liquid dextrose solution, separating said dextrose solution from the insoluble portions of said mixture, concentrating said dextrose solution, and crystallizing dextrose from said dextrose solution.

6. A method for the enzymatic production of a solidified crystalline dextrose composition from a crude starch containing amylaceous food material containing at least one non-starch constitutent selected from the class consisting of proteins and fats without the simultaneous production of conversion products caused by enzymatic action on the above non-starch constituents present in said food and without the simultaneous production of non-fermentable dextrose polymers, comprising forming a pasted aqueous slurry of said food in the presence of a protease-free, lipase-free liquefying amylase, heating the liquefied paste to inactivate enzyme materials, cooling the paste to an amyloglucosidase converting temperature, converting over 90 weight percent of the starch content of the crude amylaceous food material to dextrose by means of an amyloglucosidase substantially free of protease, lipase and transglucosidase, dehydrating the resulting dextrose solution free of protein and fat enzyme conversion products and free of non-fermentable dextrose polymers to a water content of between 25 and 16 percent, cooling the resulting concentrated dextrose solution, and allowing said cooled solution to stand until solidification takes place.

7. A method for producing dextrose from at least a portion of the starch contained within the starch granules of a crude amylaceous material, said crude amylaceous material also containing at least one non-starch constituent selected from the class consisting of proteins and fats, which comprises rupturing at least a portion of the starch granules of the crude amylaceous material to an amyloglucosidase-convertible state and subjecting said ruptured starch granules to the action of an amyloglucosidase which is substantially free from protease, lipase and transglucosidase activity thereby converting at least a portion of the starch to a dextrose-containing product which is substantially free of protease-converted products, lipase-converted products, transglucosidase-converted dextrose polymers and acid-hydrolyzed products.

References Cited by the Examiner

UNITED STATES PATENTS

| | | | |
|---|---|---|---|
| 1,773,296 | 8/1920 | Block | 99—80 |
| 2,365,788 | 12/1944 | Warburton | 99—142 |
| 2,822,303 | 2/1958 | Campbell et al. | 99—142 X |
| 2,842,442 | 7/1958 | Jeffreys | 99—90 |
| 2,881,115 | 4/1959 | Liggitt et al. | 195—66 |
| 2,891,869 | 6/1959 | Langlois | 99—142 |
| 2,893,921 | 7/1959 | Langlois et al. | 195—66 |
| 2,967,804 | 1/1961 | Kerr | 195—66 |
| 3,017,330 | 1/1962 | Kerr | 195—66 X |
| 3,039,936 | 6/1962 | Lenney et al. | 195—11 |

A. LOUIS MONACELL, *Primary Examiner.*

R. N. JONES, *Assistant Examiner.*